US007669483B1

(12) United States Patent
Feller

(10) Patent No.: US 7,669,483 B1
(45) Date of Patent: Mar. 2, 2010

(54) FLOWMETER TRANSDUCER CLAMPING

(76) Inventor: Murray F Feller, 21577 NW. 75th Avenue Rd., Micanopy, FL (US) 32677

( * ) Notice: Subject to any disclaimer, the term of this patent is extended or adjusted under 35 U.S.C. 154(b) by 0 days.

(21) Appl. No.: 12/394,111

(22) Filed: Feb. 27, 2009

(51) Int. Cl.
*G01F 1/66* (2006.01)
*A44B 1/04* (2006.01)

(52) U.S. Cl. ............................ 73/861.27; 24/279
(58) Field of Classification Search .............. None
See application file for complete search history.

(56) References Cited

U.S. PATENT DOCUMENTS

| | | | | |
|---|---|---|---|---|
| 4,242,744 A | * | 12/1980 | Rottmar | 367/173 |
| 4,320,659 A | * | 3/1982 | Lynnworth et al. | 73/589 |
| 4,735,097 A | * | 4/1988 | Lynnworth | 73/861.28 |
| 5,001,936 A | * | 3/1991 | Baumoel | 73/861.18 |
| 5,131,278 A | * | 7/1992 | Baumoel | 73/861.18 |
| 5,214,343 A | * | 5/1993 | Baumoel | 310/334 |
| 7,367,239 B2 | * | 5/2008 | Engel | 73/861.18 |
| 2005/0193839 A1 | * | 9/2005 | Gronvall | 73/866.5 |

* cited by examiner

*Primary Examiner*—Harshad Patel
(74) *Attorney, Agent, or Firm*—David Kiewit

(57) ABSTRACT

Tangential forces present at the mating area between a clamp-on transducer and a pipe can be made very small in order to provide a higher quality, more stable acoustic coupling. In some cases this is accomplished by providing a low friction bearing on a surface of a transducer housing. This bearing may be a slippery surface portion, or may involve a rotary bearing mounted on the housing. In other cases, where a steel pipe is used, pairs of permanent magnets coupled by a yoke can provide the desired clamping force directed solely along a radius of the pipe.

3 Claims, 4 Drawing Sheets

FLOWMETER TRANSDUCER CLAMPING

BACKGROUND OF THE INVENTION

1. Field of the Invention

The present invention relates to acoustic transducer apparatus and methods for measuring a rate of flow of a fluid through a pipe. More specifically, the invention relates to arrangements in which ultrasonic transducers are clamped to an external surface of the pipe.

2. Background Information

Transit time flow meters used to measure the rate of flow of fluids through a pipe commonly employ clamp-on transducers attached against an external surface of the pipe. In these applications the transducers are commonly held against the pipe with screw-tensioned clamp bands. When these bands are tightened during installation, unbalanced frictional forces can move the transducer tangential to the pipe and can torque a portion of the transducer away from intimate acoustic contact with the pipe. Moreover, clamp band tension can change due to temperature or other factors, thus leading to flow sensor drift and loss of precision and reliability.

Current art clamp-on transducers typically reflect a compromise between acoustic coupling and mechanical mounting considerations. Some degradation of coupling is accepted in exchange for mechanical convenience. For example, a relatively large mounting area between the transducer and the pipe may be provided in order to bring an acceptable degree of mechanical stability to the transducer mounting. This also means that less of the available clamping force is applied directly to the area transmitting the acoustic energy. Hence, acoustic coupling promoters, such as silicone greases, can play a bigger role in maintaining the acoustic energy path. Because coupling promoters tend to evaporate, wick away or otherwise degrade or leave the area over a period of time, the transducer mounting may require frequent maintenance effort.

In some known arrangements, clamp-on transducers are made with a reduced height so as to press more evenly against the pipe. In these cases, the increase in clamp band tension needed for a reliable acoustic connection tends to become excessive, thus dissipating any advantage gained by this procedure.

It is further noted that uneven movement in a clamp band as it is tightened can move a transducer along the pipe. When this happens, the clamp band must be loosened and the clamping process restarted.

BRIEF SUMMARY OF THE INVENTION

One aspect of the present invention is that it provides a method for substantially reducing tangential forces present at the mating area between a clamp-on transducer and a pipe. In one preferred embodiment this is accomplished by the use of at least one low friction bearing on a portion of a transducer housing distal from the pipe. This arrangement aids in translating the tension in a clamp band to a clamping force directed substantially entirely along a radius of the pipe. Because non-radial forces are reduced, the transducer housing may be made relatively tall to enable high mating pressures to be realized. This can result in a more stable acoustic connection and improved meter performance.

The clamp band may optionally incorporate a sensing spring which can change in dimensions with band tension in order to serve as a tensioning gauge for the installer.

Another aspect of the invention is that it provides an acoustic flowmeter for measuring flow of fluid along an axis of a ferromagnetic pipe, where the flowmeter comprises an ultrasonic transducer disposed within a housing clamped to an external surface of the pipe by a magnetic clamping mechanism. In preferred embodiments the magnetic clamping mechanism can comprise a pair of permanent magnets juxtaposed about the housing. In addition, there may be a yoke extending between the two magnets so as to impose a clamping force directed substantially entirely along a selected radius of the pipe for clamping the transducer housing to the pipe Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. At the outset of this Description, one may note that the terms "include" and "comprise," as well as derivatives thereof, mean inclusion without limitation; the term "or," is inclusive, meaning and/or. Moreover, the term 'tangential' refers to a direction, measured at an external surface of a pipe, that is mutually perpendicular to a pipe axis and to any pipe radius.

Figure 1:
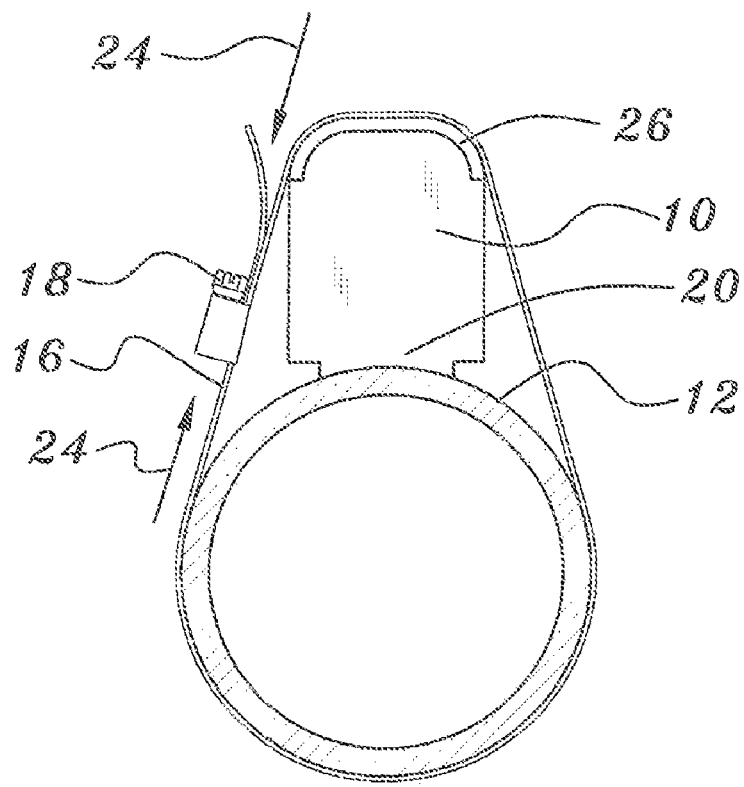
FIG. 1 is a partly schematic cross-sectional view of a transducer mounted on a pipe, the section taken in a plane perpendicular to the axis of the pipe.

Turning now to FIG. 1, one finds a transducer housing 10 mounted on a pipe 12 which contains a fluid 14. The transducer housing 10 is pressed to the pipe 12 by the tension of a clamp band 16, arranged to loop around the pipe and the transducer housing. A tension adjustment screw 18 tightens the clamp band 16 to mechanically attach the transducer and housing to the pipe. The band is preferably positioned directly over an acoustic transducer coupling member 20 defining one end of a transmission path. Contact between the bottom of the entire length of the transducer housing and the pipe may be made for mechanical stability.

The transducer housing 10 may be of any of a wide range of designs, but is generally configured to hold a conventional transducer stack (not shown) comprising a piezoelectric element bonded to various other elements, one of which is a coupling member 20 disposed at or below the bottom of the housing 10 and curved to conform to the outside of the pipe in order to provide a short acoustic transmission path that is mechanically stable. The skilled reader will appreciate that inasmuch as the transducer is firmly mounted or embedded within a housing, arrangements for clamping the housing to a pipe also clamp the transducer coupling member and the rest of the transducer stack to the pipe. Thus, the ensuing discussion sometimes refers to clamping a transducer and sometimes refers to clamping a housing.

When the tensioning screw 18 is tightened the two ends of the clamp band are drawn together as indicated by the arrows 24 so that the clamp band slides along the top of the transducer housing. Friction between the clamp band and the transducer housing creates a torque tending to tip the transducer housing. This can result in uneven mounting pressures which can lead to mechanical instability and a high reliance on coupling promoters.

A spring 22 may be added to the clamp band 16 to provide a dedicated tensioning means. The dimensional change of the spring 22 can provide an indication of tension so that the installer can make the installation to factory specifications and reestablish the same mounting conditions should the transducer need to be removed and replaced for example. The tension band tensioning adjustment torque may also be used as a means for a known tensioning value.

Figure 2A:
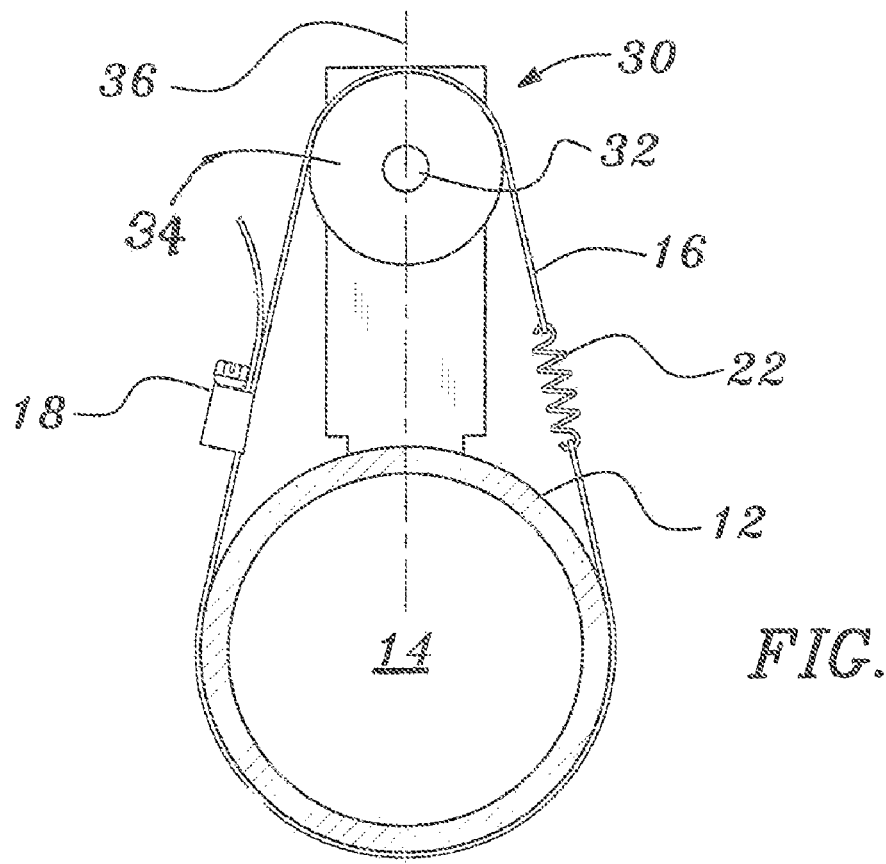
FIG. 2A is a partly schematic cross-sectional view, taken perpendicular to an axis of a pipe, of an embodiment of the invention in which a rotary bearing is interposed between a clamp band and a transducer housing.
Figure 2B:
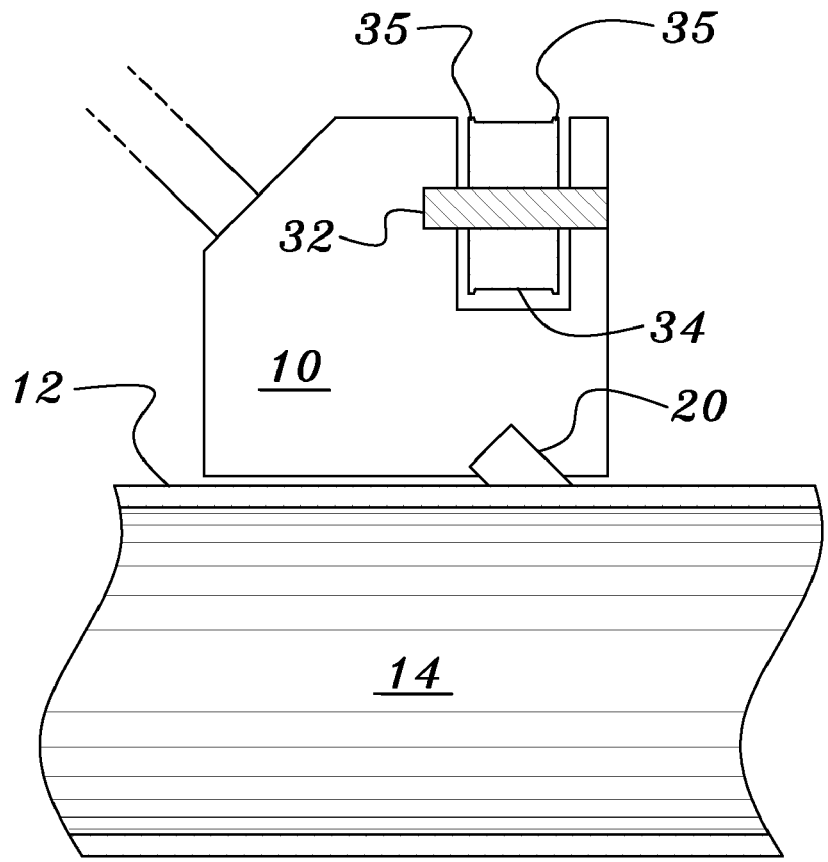
FIG. 2B is a partly schematic cross-sectional view of the apparatus of FIG. 2A, the view taken in a plane including the axis of the pipe, from which the clamp band has been omitted in the interest of clarity of presentation.

In one embodiment of the invention, the prior art clamping arrangement is improved by providing a slippery surface portion 26 on at least a portion of the transducer housing distal from the pipe. This surface is characterized by a sufficiently low coefficient of friction as to substantially prohibit the clamp band from applying a force component directed tangential to the pipe. In one embodiment, the slippery surface portion may be of a stable low friction bearing material such as Delrin AF or polytetrafluoroethylene. By this means, one can reduce the coefficient of friction for a steel band from 0.2 (if the housing is steel) to 0.025 if polytetrafluoroethylene is employed FIGS. 2A and 2B depict another embodiment of the current invention which is similar to that depicted in FIG. 1, but which has a low friction rotary bearing arrangement 30 incorporated in the transducer housing and abutting the clamp band. The bearing arrangement comprises a shaft 32 journaled within a portion of the housing and, in some embodiments, a drum portion 34 extending outward from the shaft. A bearing arrangement of this sort is operable to remove substantially all of the forces applied tangential to the pipe and to thereby supply a clamping force that is substantially entirely directed along the radius of the pipe that extends through the bearing shaft as indicated by the dash-dot line 36 in FIG. 2A. Although the drawing depicts the use of a single shaft and drum, other variations of a rotary bearing structure are comprehended by the invention and include, without limitation, the provision of a roller bearing comprising a plurality of rollers on the top surface of the transducer housing. Based on measurements made by others on different roller bearings, one would expect the effective coefficient of friction to be reduced to about 0.003 when a roller bearing configuration is used with a steel band. With a relatively small shaft diameter, as shown, the invention should reduce the tangential force component to less than 1% of the prior art value so that a clamp band force is applied essentially entirely along a radius of a pipe.

Using a drum 34 in a bearing arrangement of the invention can provide several benefits. Choosing a large enough radius for the drum can ensure that the clamp band does not touch a side of the housing. Moreover, if the drum 34 is provided with a rim 35, or other centering structure, the clamp band can be retained in a desired position. This can be particularly useful during installation when the relatively loose band is subject to falling off the housing.

Because the preferred bearing arrangement removes nearly all the orthogonal torque component from affecting the transducer, the attachment is relatively stable. Hence, the transducer contact area, through which the passage of acoustic energy occurs, can be reduced. This allows one to make a transducer housing that is narrower and taller that is found in the prior art.

A low friction bearing system comprising a rotating member is believed to be generally preferable to one that merely provides a low coefficient of sliding friction. This is because the bands commonly used for clamping applications have mechanical irregularities, such as grooves, bumps, etc., which prevent them from sliding smoothly. However, if the bands are so processed as to glide smoothly over bearing surfaces, the bearing system may be made without moving parts—i.e., may comprise a slippery bearing surface.

Figure 3:
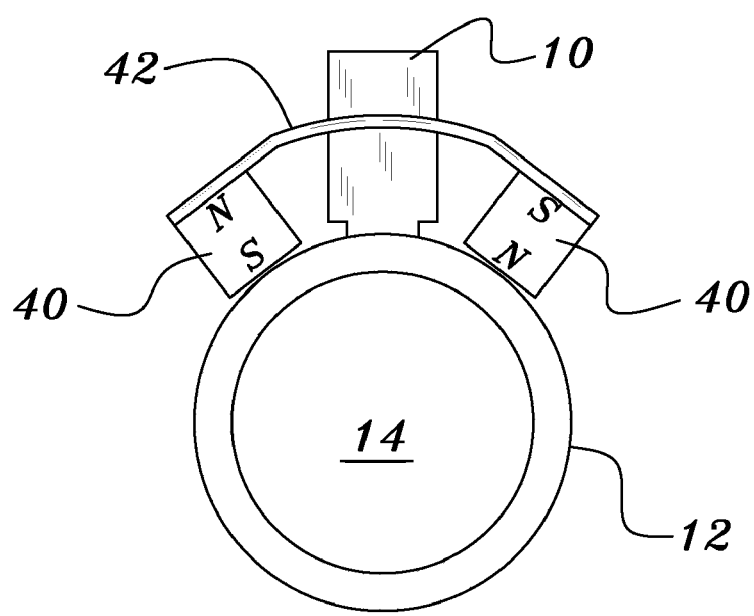
FIG. 3 is a schematic cross-sectional view of a clamping arrangement of the invention in which a flexible yoke extending between two radially oriented permanent magnets bears on a transducer housing.
Figure 5:
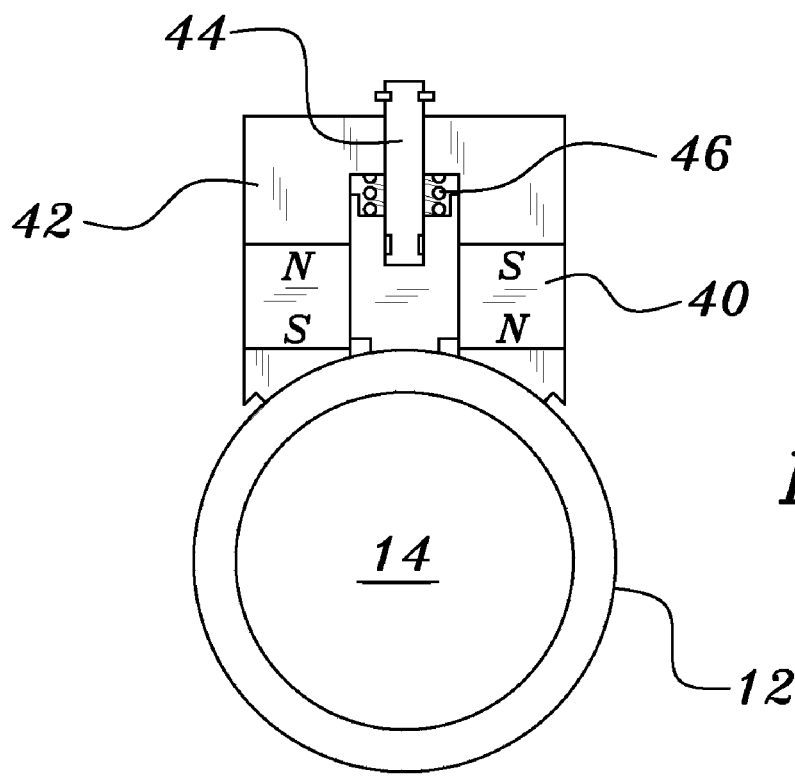
FIG. 5 is a schematic cross-sectional view of a clamping arrangement of the invention similar to that of FIG. 4, but in which the permanent magnets are aligned parallel to a coil spring that supplies a radially directed clamping force to a transducer housing.

Although the typical method for surface mounting ultrasonic transducers on pipe is with the use of clamp bands, transducers may also be attached with permanent magnets 40 if the pipe is ferromagnetic, as depicted in FIG. 3 though FIG. 5. This sort of arrangement could be used in a large number of applications such as heating and cooling loops of commercial buildings. This attachment method enables the transducers to be mounted on the pipes with far greater ease than is available with band clamps because the pipe need only be accessed and its insulation removed in the immediate area of the mounting.

Pairs of high strength magnets 40 provide sufficient holding power and long term stability for transducers and their housings to be permanently retained in place. In preferred embodiments, magnets 40 are juxtaposed about a transducer housing 10 and may be coupled to the housing by a suitable yoke 42. Those skilled in the art will recognize that the magnetic flux paths may comprise various ferromagnetic materials. A wide range of such materials is compatible with stable flux paths which do not change because of dimensional changes of any the mechanical components.

In some embodiments, as depicted in FIG. 3, the transducer housing 10 and each of the magnets 40 is disposed along a respective radius of the pipe. The magnets are linked by a yoke 42 or saddle that both provides a magnetic path between them and serves as a flat spring to provide a radial clamping force to the transducer housing 10.

Figure 4:
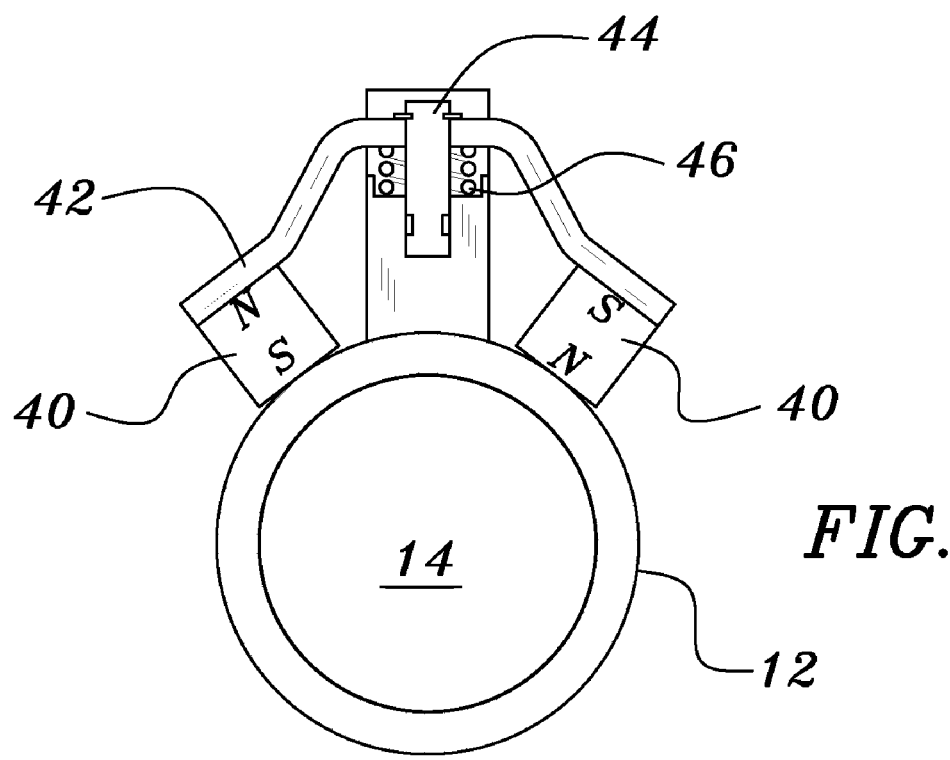
FIG. 4 is a schematic cross-sectional view of a clamping arrangement of the invention in which a yoke extending between two radially oriented permanent magnets bears on a coil spring that supplies a radially directed clamping force to a transducer housing.

In another embodiment, as depicted in FIG. 4, the yoke may be rigid and may be coupled to the transducer housing by the depicted combination of an optional locating pin 44 and a helical spring 46 having an axis extending along a radius of the pipe so as to provide a substantially entirely radially directed clamping force. In embodiments of this sort a mechanical adjustment mechanism, such as an adjustment screw (not shown), can be used to regulate the clamping force. Moreover, experiments have shown that in many cases the locating pin 44 can be omitted allowing for a simpler structure comprising the yoke and the helical spring.

In yet an additional embodiment, as depicted in FIG. 5, the clamping magnets 40 do not extend along radii of the pipe 12, but are parallel to the radius along which the transducer housing 10 is aligned. In the depicted embodiment the combination of the yoke 42 and coil spring 46 ensure that a substantially entirely radially oriented clamping force is applied.

When the transducer housing is mounted on a pipe by means of permanent magnets, the pole pieces generally bottom out on the pipe surface and the yoke or saddle is rigidly held in place. The stability of the spring then becomes the primary factor in determining the long term variance in pressure exerted at the location of the acoustic transmission path. Because spring stability can be very good with time, temperature and other variables, the instabilities associated with this should be relatively small.

A transducer housing may preferably be configured to accept either of the magnetic yoke 42 or the bearing system 30 that cooperates with a clamp band 16. This would enable the same transducer and housing to be used for magnetic as well as non-magnetic pipes.

Figure 6:
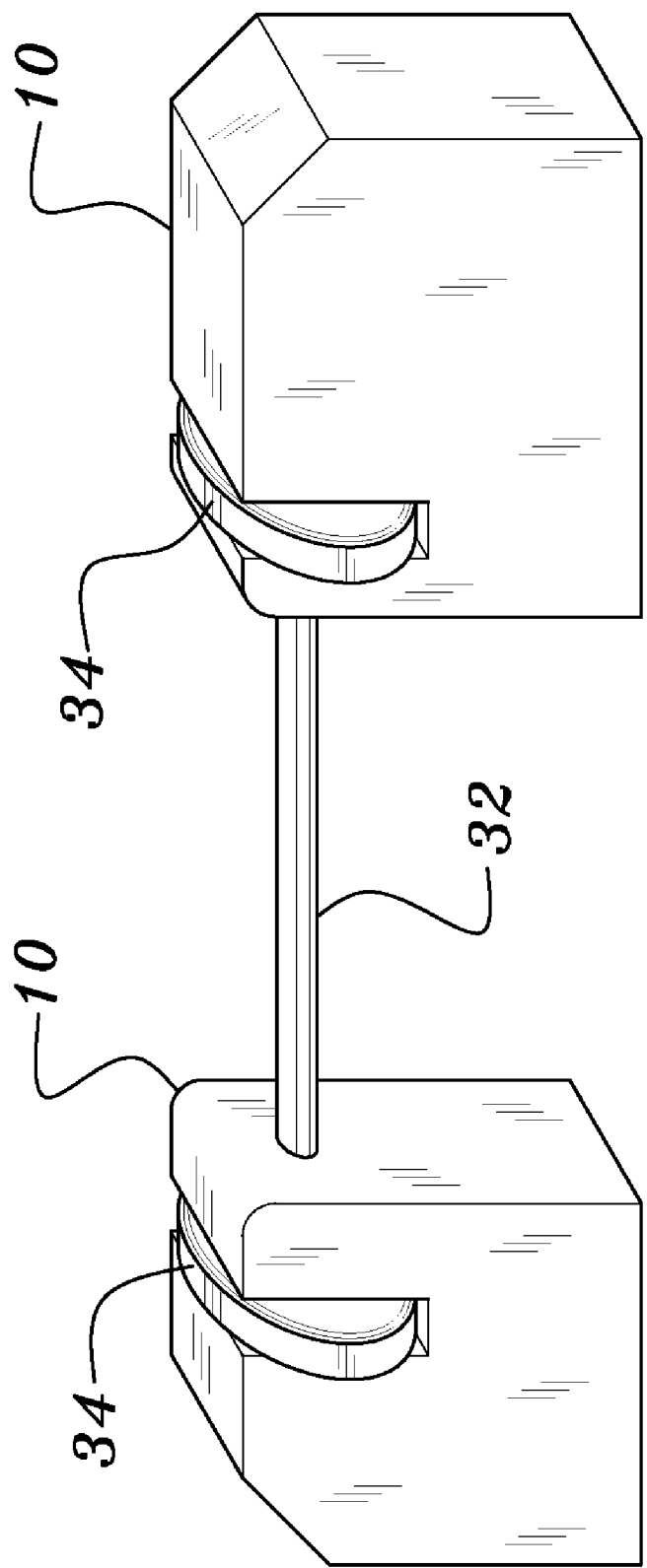
FIG. 6 is a perspective view of two transducer housings having rotary bearings and linked by a common bearing shaft.

Additionally, when a rotary bearing system 30 is used, two transducer housings 10 can be configured with a common shaft 32 extending between them, as depicted in FIG. 6. In such cases the length of the common shaft 32 is selected to ensure that the spacing between two transducers accords with what is needed to provide an acoustic path through fluid flowing in a pipe having a selected size. The same sort of spacing control arrangement is possible when using the magnetic embodiments of the invention, although in those cases the spacing rod need not be associated with a bearing.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A flowmeter for measuring flow of fluid through a pipe having a radius, the flowmeter comprising:
   a pair of ultrasonic transducers disposed within respective housings clamped to an external surface of the pipe by respective clamping mechanisms comprising respective screw-tensioned clamp bands and respective bearing members; and
   a common shaft extending between the two housings and journaled within each of them, whereby the clamping mechanisms are operable to supply respective clamping forces directed substantially entirely along the radius of the pipe.

2. The flowmeter of claim 1 wherein each clamping mechanism comprises a respective screw-tensioned clamp band abutting a surface portion of the respective housing having a low enough coefficient of friction to substantially prohibit the respective clamp band from applying to the respective housing a force component directed tangential to the pipe.

3. A flowmeter for measuring flow of fluid along an axis of a pipe having a radius, the flowmeter comprising an ultrasonic transducer disposed within a housing clamped to an external surface of the pipe by a clamping mechanism comprising:
   a flexible clamp band having an adjustable length, the clamp band capturing the housing and the pipe, the clamp band comprising a tension adjusting screw operable to adjust the length of the clamp band; and
   a portion of the housing abutting the clamp band comprising a drum journaled about a shaft disposed parallel to the axis of the pipe so as to allow the clamp band to apply a clamping force substantially entirely directed along the radius of the pipe.

\* \* \* \* \*